United States Patent
Chergui et al.

(10) Patent No.: US 10,286,610 B2
(45) Date of Patent: May 14, 2019

(54) METHOD AND APPARATUS FOR PRODUCING JOINING REGIONS OF COMPOSITE SHEETS

(71) Applicant: THYSSENKRUPP STEEL EUROPE AG, Duisburg (DE)

(72) Inventors: Azeddine Chergui, Dortmund (DE); Jürgen Goldmann, Waltrop (DE); Mustafa Al, Dortmund (DE)

(73) Assignee: THYSSENKRUPP STEEL EUROPE AG, Duisburg (DE)

( * ) Notice: Subject to any disclaimer, the term of this patent is extended or adjusted under 35 U.S.C. 154(b) by 0 days.

(21) Appl. No.: 14/916,137

(22) PCT Filed: Aug. 29, 2014

(86) PCT No.: PCT/EP2014/068330
§ 371 (c)(1),
(2) Date: Mar. 2, 2016

(87) PCT Pub. No.: WO2015/032693
PCT Pub. Date: Mar. 12, 2015

(65) Prior Publication Data
US 2016/0200041 A1  Jul. 14, 2016

(30) Foreign Application Priority Data
Sep. 5, 2013  (DE) .......... 10 2013 109 686

(51) Int. Cl.
*B21D 22/02* (2006.01)
*B23K 11/34* (2006.01)
(Continued)

(52) U.S. Cl.
CPC ........ *B29C 66/7392* (2013.01); *B21D 22/022* (2013.01); *B23K 11/34* (2013.01);
(Continued)

(58) Field of Classification Search
CPC .. B21D 22/022; B21D 22/203; B21D 35/007; B21D 39/031; B21D 28/24; B21D 28/26;
(Continued)

(56) References Cited

U.S. PATENT DOCUMENTS 4,072,843 A    2/1978  Szabo
4,223,547 A *  9/1980  Epner ................... B21D 28/10
                                                             72/254

(Continued)

FOREIGN PATENT DOCUMENTS

CN    103269824 A    8/2013
DE      2137784 A1    2/1972
(Continued)

OTHER PUBLICATIONS

Machine translation of EP1679147A2, Feller et al., pp. 1-25, translated on Feb. 28, 2017.*
(Continued)

*Primary Examiner* — Teresa M Ekiert
(74) *Attorney, Agent, or Firm* — Lathrop Gage L.L.P.

(57) ABSTRACT

Joining regions in sandwich sheets having a plastic core layer disposed between two metal cover layers are desirable for purposes of joining sandwich sheets to other components by, for instance, fasteners and/or welded joints. Methods and apparatuses for producing such joining regions in sandwich sheets allow for durably form-fitting and/or force-fitting joints between the sandwich sheets and other components. Some methods may involve displacing plastic material of the core layer of the sandwich sheet out of the region to be joined. A predetermined force may be exerted perpendicular to a surface of the region to be joined when the core layer of the sandwich sheet is heated so that the plastic material of the core layer is softened and at least partially displaced. In turn, the metal cover layers of the sandwich sheet may be
(Continued)

brought into contact with one another in the region to be joined.

12 Claims, 7 Drawing Sheets

(51) Int. Cl.
*B29C 65/00* (2006.01)
*B29C 67/00* (2017.01)
*B32B 43/00* (2006.01)
*B29K 101/12* (2006.01)
*B29L 9/00* (2006.01)

(52) U.S. Cl.
CPC ........ *B29C 66/742* (2013.01); *B29C 66/8242* (2013.01); *B29C 66/8244* (2013.01); *B29C 67/0011* (2013.01); *B29C 67/0044* (2013.01); *B32B 43/00* (2013.01); *B29K 2101/12* (2013.01); *B29L 2009/003* (2013.01)

(58) Field of Classification Search
CPC . B21D 28/343; B29C 66/7392; B29C 66/742; B29C 66/8242; B29C 66/8244; B29C 37/001; B29C 67/0044; B23K 11/34; B32B 43/00; B32B 43/003
USPC .......................................... 72/325, 333, 258
See application file for complete search history.

(56) References Cited

U.S. PATENT DOCUMENTS

| | | | |
|---|---|---|---|
| 4,650,951 A * | 3/1987 | Koga .................... | B23K 11/163 219/118 |
| 6,294,751 B1 * | 9/2001 | Gall .................... | B23K 11/0053 219/107 |
| 2004/0221639 A1* | 11/2004 | Woo ........................ | B21D 22/02 72/370.04 |

FOREIGN PATENT DOCUMENTS

| | | | | |
|---|---|---|---|---|
| DE | 69300125 T | 12/1995 | | |
| DE | 102010061502 A | 1/2012 | | |
| DE | 102012109047 B | 2/2014 | | |
| DE | 102012109046 A1 | 4/2014 | | |
| EP | 1072349 A1 | 1/2001 | | |
| EP | 1679147 A2 * | 7/2006 | ........... | B23K 11/115 |
| JP | S55149594 A | 11/1980 | | |
| JP | 2008183622 A | 8/2008 | | |

OTHER PUBLICATIONS

Int'l Search Report for PCT/EP2014/068330 dated Nov. 26, 2014 (mailed Dec. 5, 2014).

* cited by examiner

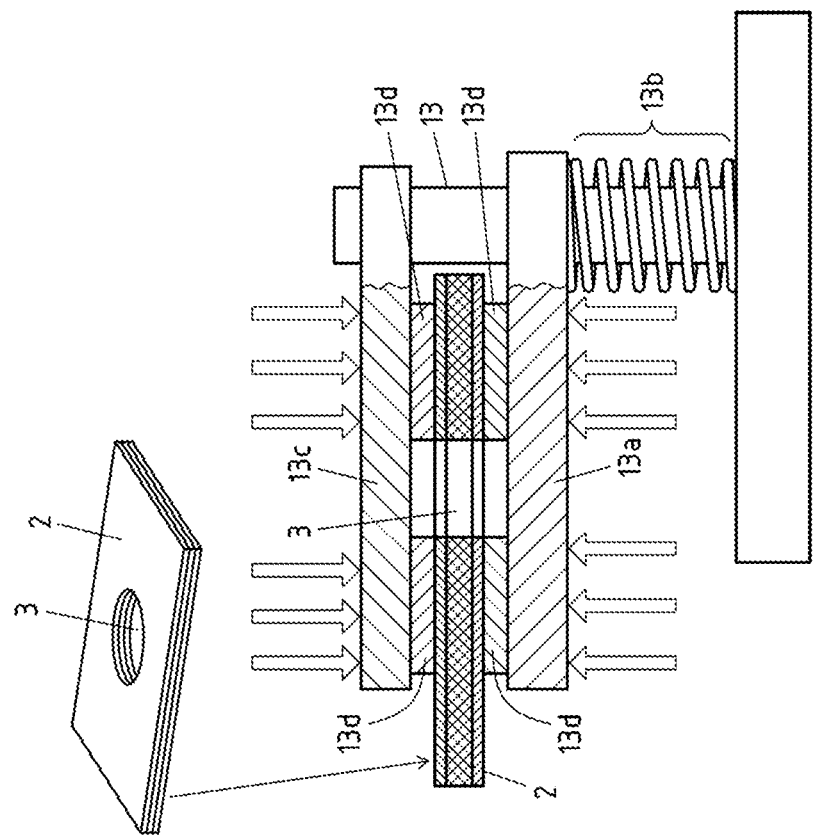
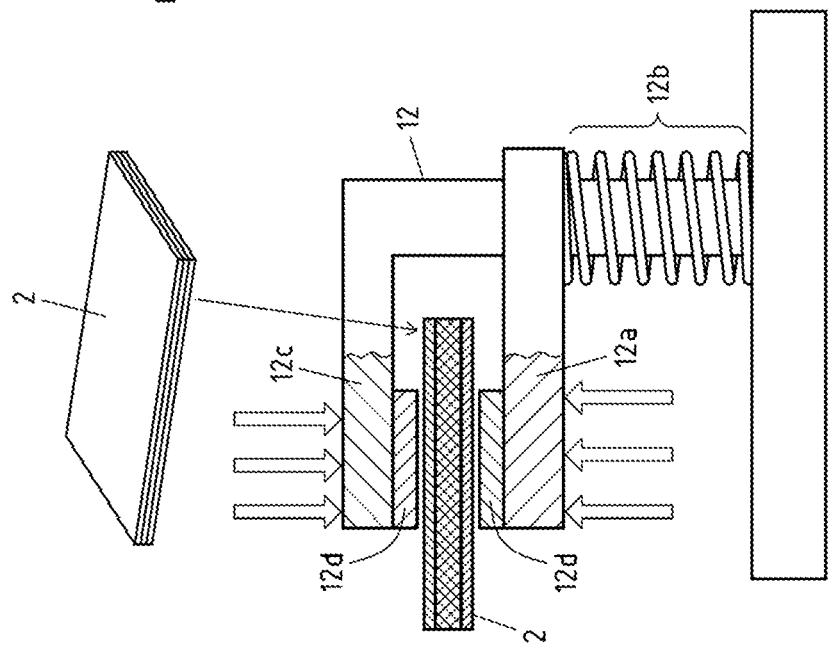

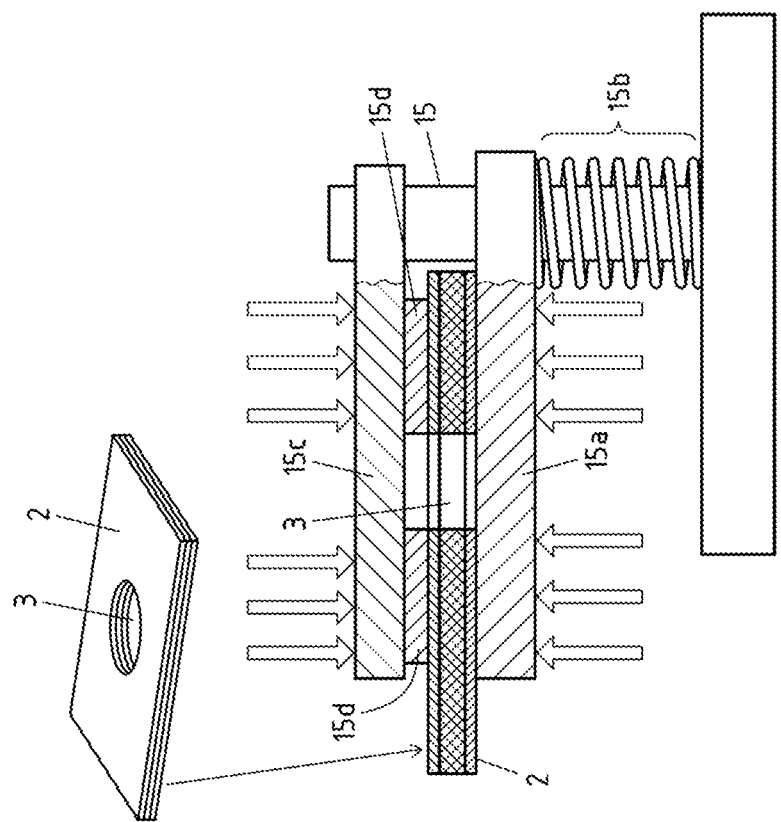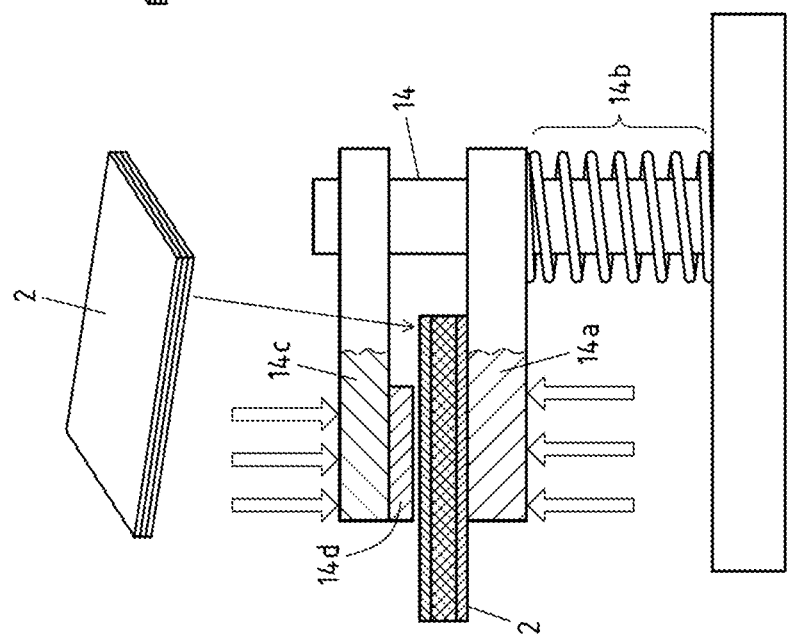

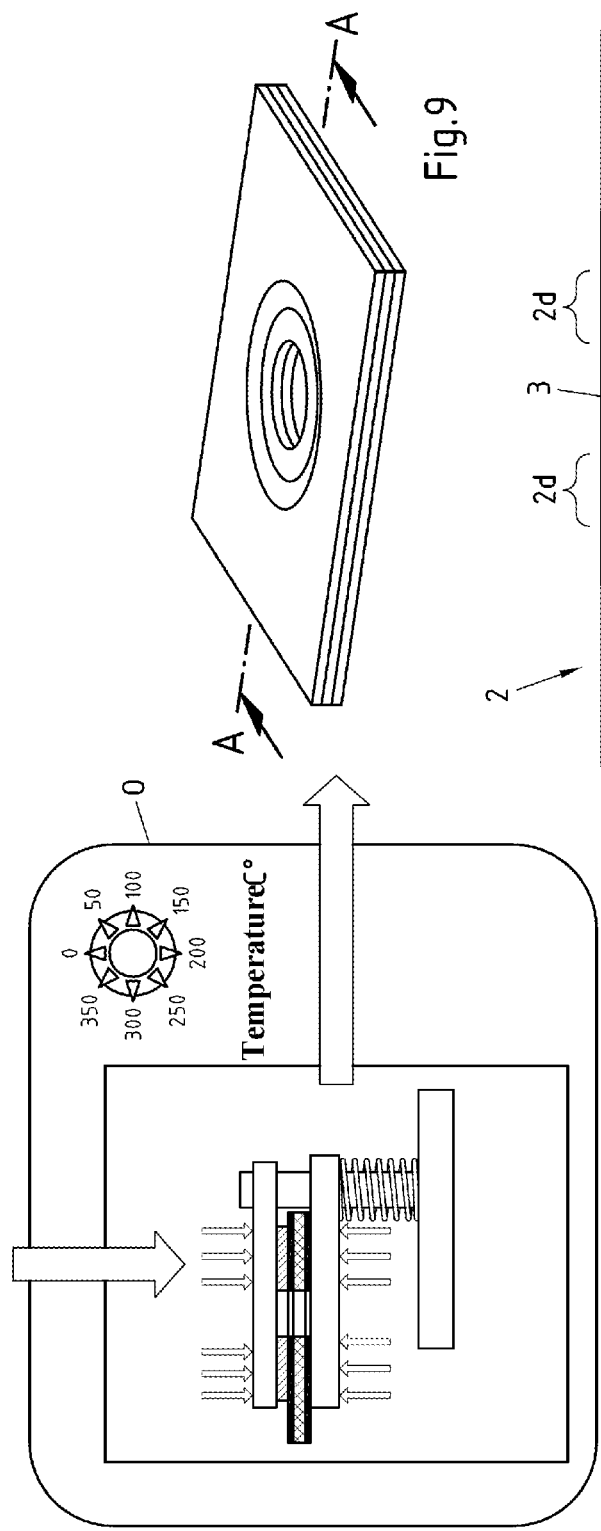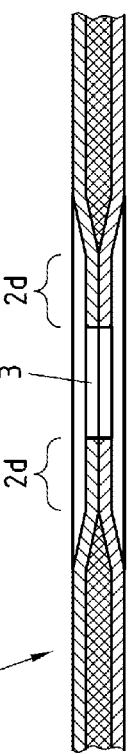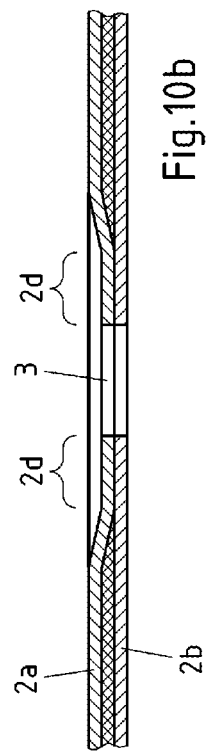

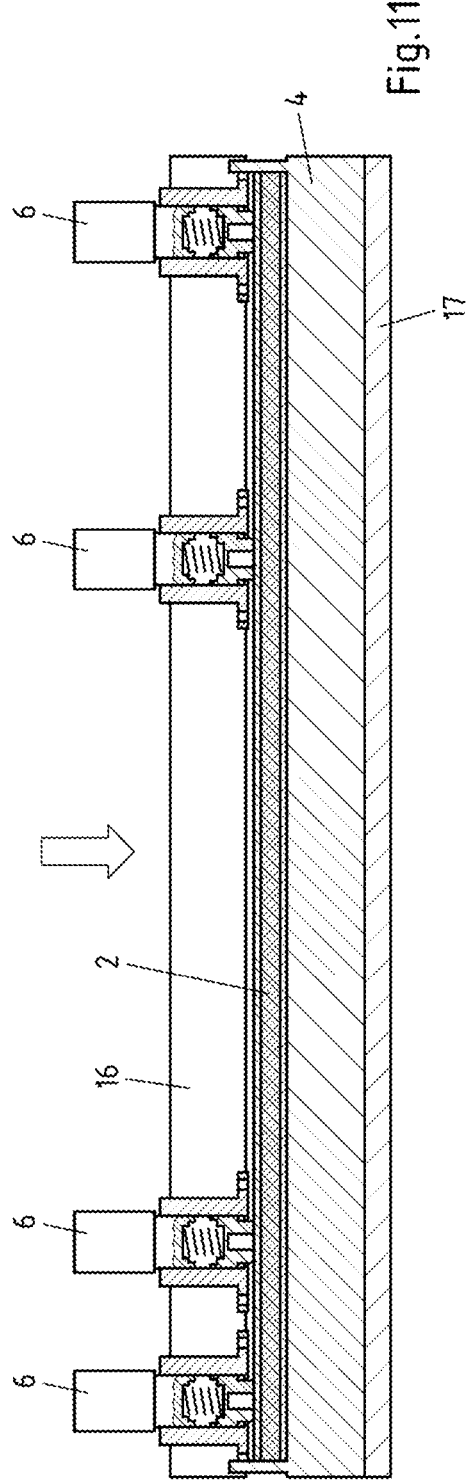
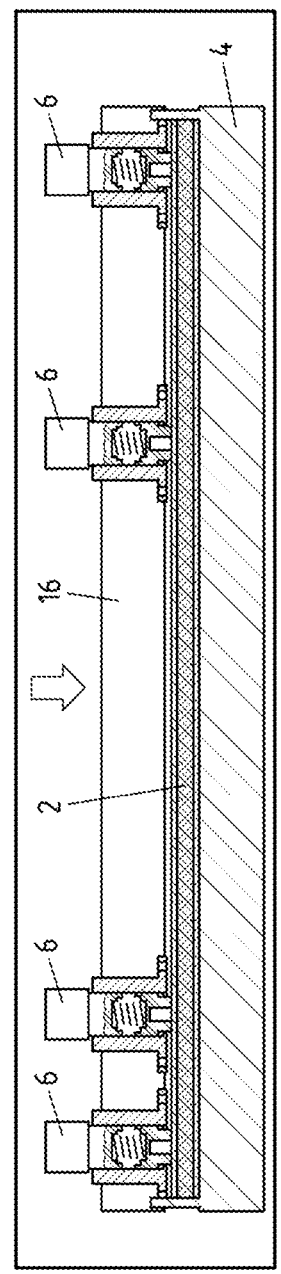

METHOD AND APPARATUS FOR PRODUCING JOINING REGIONS OF COMPOSITE SHEETS

CROSS REFERENCE TO RELATED APPLICATIONS

This application is a U.S. National Stage Entry of International Patent Application Serial Number PCT/EP2014/068330, filed Aug. 29, 2014, which claims priority to German Patent Application No. DE102013109686.7 filed Sep. 5, 2013, the entire contents of both of which are incorporated herein by reference.

FIELD

The present disclosure relates to apparatuses and methods for producing joining regions of a sandwich sheet having metal cover layers disposed about a plastic core layer.

BACKGROUND

Sandwich sheets, which usually have two outer metal cover sheets and at least one nonmetallic core layer arranged between the metal cover layers, said nonmetallic core layer preferably consisting of thermoplastic material, are used in order to provide composite sheet parts which have properties that are at least mutually exclusive in a sheet made of solid material. A sandwich sheet, in spite of its low weight, for example, allows locally very good stiffness and can simultaneously provide very good sound insulation properties. High tensile strengths with a simultaneously reduced weight can also be realized via sandwich sheets. Many applications require these sandwich sheets to be joined to other sheet parts or components. The joining methods that are frequently employed for sheets, for example fusion welding or soldering, cause problems, however, on account of their high heat input into the sandwich sheets. The thermoplastic layer usually used melts at least partially even in surrounding regions of the fastening or is damaged in some other way by the high heat input. In order to join a sandwich sheet to a further component, it is also possible to use a force-fitting and/or form-fitting joint, however, by using a fastening means, for example a screw or a rivet. However, it has been found that in the case of screwed joints or riveted joints, long-lasting firmness of these joints cannot be ensured on account of the creep behavior of the nonmetallic core layer, which generally consists of plastics material. The retaining force which the sandwich sheet has to provide with respect to the rivet or screw decreases on account of the creep behavior of the plastics material. As a result, or on account of the loss of the preloading force, the joint between the sandwich sheet and sheet or component loosens.

BRIEF DESCRIPTION OF THE FIGURES

FIG. 3 is a schematic cross-sectional view of an example apparatus in the form of a clamping apparatus for producing at least one joining region in a sandwich sheet that does not have an opening.

FIG. 4 is a schematic cross-sectional view of an example clamping apparatus for producing at least one joining region in a sandwich sheet that includes an opening.

FIG. 5 is a schematic cross-sectional view of another example apparatus in the form of a clamping apparatus for producing at least one joining region in a sandwich sheet that does not have an opening.

FIG. 6 is a schematic cross-sectional view of another example clamping apparatus for producing at least one joining region in a sandwich sheet that includes an opening.

FIG. 8 is a schematic representing an example step of heating an example core layer of an example sandwich sheet.

FIG. 9 is a schematic perspective view of an example sandwich sheet after an example method has been performed.

FIG. 10a is a cross-sectional view of an example sandwich sheet having a joining region for joints suitable for screwing that was produced by the example apparatus shown in FIG. 4.

FIG. 10b is a cross-sectional view of an example sandwich sheet having a joining region for joints suitable for screwing that was produced by the example apparatus shown in FIG. 6.

FIG. 11 is a schematic cross-sectional view of an example mechanism for displacing plastic material from a sandwich sheet via an example positioning mechanism and ultrasonic vibrations.

FIG. 12 is a schematic cross-sectional view of an example receptacle and an example mechanism for displacing plastic material disposed in an oven that can be heated for purposes of equipping sandwich sheets with joining regions.

DETAILED DESCRIPTION

Figure 2:
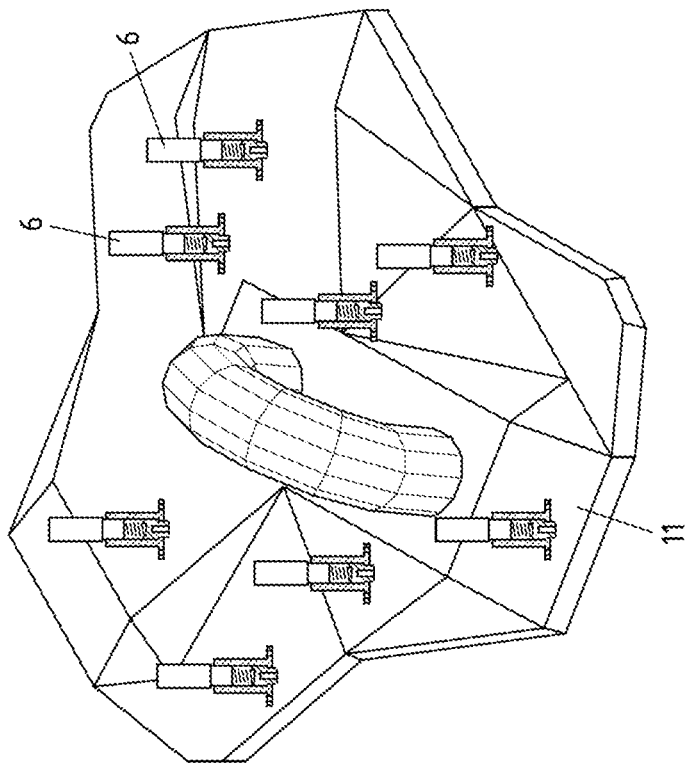
FIG. 2 is a schematic perspective view of another example apparatus for producing a plurality of example joining regions in an example sandwich sheet.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

The present disclosure concerns apparatuses and methods for producing at least one joining region of a sandwich sheet that has at least two metal cover layers disposed about at least one core layer that comprises a plastics material. In some examples, the joining region is suitable for joining the sandwich sheet to a further component or sheet by using fastening mechanisms or a welded joint, for instance. The present disclosure also concerns receptacles for the sandwich sheet and mechanisms for displacing the plastics material out of the joining region.

Proceeding from the problem identified above, the present disclosure is based at least in part on the object of proposing a method and an apparatus for producing at least one joining region of a sandwich sheet, with which method or apparatus it is possible to create a joining region in a sandwich sheet which is suitable for joining the sandwich sheet to a further component or sheet via a welded joint or via fastening means, i.e. durably allows a form-fitting and/or force-fitting joint between the sandwich sheet and sheet (solid sheet or sandwich sheet) or component via fastening means. Furthermore, the joining region is intended to be produced as cost-effectively and reliably as possible.

According to a first teaching of the present invention, the object presented above is achieved for a method in that means for displacing the plastics material of the core layer out of the joining region are arranged in at least one joining region, the means for displacing the plastics material are preloaded such that a predetermined force is exerted perpendicularly to the surface of the at least one joining region of the sandwich sheet, the core layer of the sandwich sheet is heated such that, when the plastics material of the core layer of the sandwich sheet softens, the metal cover layers of the sandwich sheet are brought into contact by the force of the means for displacing the plastics material in at least one joining region by the plastics material being at least partially displaced.

As a result of the use of means for displacing the plastics material of the core layer that are able to be preloaded, the production of joining regions in sandwich sheets can take place independently of the provision of costly forming tools. As a result, costs for providing the joining regions can be reduced considerably and the flexibility in the arrangement of the joining regions can be increased. The joining regions can be used for welded joints but also for other durable joints between the sandwich sheet and further components by using fastening means, for example screws or rivets.

According to a first configuration of the method, the joining region therefore comprises an opening in the sandwich sheet, wherein the metal cover layers are brought at least partially into contact in the peripheral region of the opening by the plastics material being displaced. As a result, openings that are suitable for example for screwed joints can be provided in a sandwich sheet in that the substantially metal peripheral region of the opening can be used to build up the retaining forces of the screwed joint.

If, according to a further configuration of the method, a plurality of means for displacing the plastics material are arranged in a plurality of joining regions and at the same time the metal cover layers are brought at least partially into contact in a plurality of joining regions of the sandwich sheet, the method can be further improved in terms of its cost-effectiveness. This is allowed in particular by the use of the preloaded means for displacing the plastics material. These means can specifically be positioned and preloaded before the plastics material of the core layer is heated.

According to a further configuration, one metal cover layer or both metal cover layers are deformed in at least one joining region. If, for example, only one metal cover layer is deformed, the other metal cover layer can remain with its outer face in the plane of the sandwich sheet, and so the joining region results in a local depression in the sandwich sheet only on one side of the sandwich sheet. On the other hand, it is also possible for both metal cover layers to be deformed, such that the metal region which is used for example for a screwed joint can be arranged both in the plane between the two metal cover layers and outside the planes of the two metal cover layers.

According to a further configuration of the method, the sandwich sheet is first of all introduced into a receptacle, at least one means for displacing the plastics material is positioned on that side of the sandwich sheet that is the far side from the receptacle in the region of the joining region to be produced, via form-fitting and/or force-fitting means, a joint that is suitable for force transmission is produced between the means for displacing the plastics material and the sandwich sheet via the receptacle, the means for displacing the plastics material are preloaded, and the core layer of the sandwich sheet is heated at least in the region of the joining region until it softens. As a result of the use of a receptacle for the sandwich sheets, the means for displacing the plastics material can be positioned much more precisely on that side of the sandwich sheet that is remote from the receptacle. The form-fitting and/or force-fitting means, which ensure force transmission from the means for displacing the plastics material to the sandwich sheet via the receptacle, can also be used to position the means for displacing the plastics material or the sandwich sheet. The heating of the sandwich sheet can take place easily in the receptacle. Furthermore, the joining regions can be formed differently by an appropriate design of the receptacle in the joining regions, such that, for example in different joining regions, both metal cover layers or only one of the metal cover layers are/is deformed when the plastics material is displaced.

According to a further configuration of the method, the core layer of the sandwich sheet is heated by using means for convective, conductive or radiative heat transfer. Means for convective heat transfer, for example hot air fans, can transfer the heat to the metal cover layers of the sandwich sheet very quickly and efficiently. On account of the good heat conduction, the heat in the metal cover layers is passed on quickly to the core layer, consisting of plastics material, of the sandwich sheet. Conductive heat transfer can take place for example via heating elements provided in the receptacle, these having very precise temperature control. Radiative heat transfer is contactless and can be provided for example via infrared radiators, LEDs or other electromagnetic radiation sources.

According to a preferred embodiment of the method, the core layer of the sandwich sheet is heated by using ultrasonic vibrations. The use of ultrasonic vibrations can result in very precise heating of the core layer of the sandwich sheet, in particular on account of the different sound-conducting capabilities of the materials metal and plastics material.

Preferably, the means for displacing the plastics material displace the plastics material out of the joining region by using a punch guided perpendicularly to the sandwich sheet surface, wherein optionally the punch has a recess for receiving the displaced plastics material. The guidance of the punch makes it possible to introduce the force uniformly and precisely into the sandwich sheet in order to displace the plastics material. As a result, the entire region which is engaged by the punch is subjected to a predefined force such that the plastics material is pressed very precisely out of the entire region covered by the punch.

According to a further configuration of the method, the force of the means for displacing the plastics material is generated at least in part pneumatically, hydraulically and/or via a mechanical spring. Pneumatic and hydraulic generation of the force of the means for displacing the plastics material can be controlled easily, such that for example when a plurality of means for displacing the plastics material are used in a plurality of joining regions, an identical force can be applied to the sandwich sheet easily in every joining region. The use of a mechanical spring represents a particularly simple and cost-effective provision of the force for displacing the plastics material out of the joining region.

If the means for displacing the plastics material are positioned in a manner guided via guide means of the receptacle for the sandwich sheet, the positioning accuracy of the means for displacing the plastics material can be increased further. Suitable guide means may be for example pins which are arranged in the receptacle.

According to a further configuration of the method, a plurality of means for displacing the plastics material are positioned simultaneously via positioning means, wherein the positioning means predetermine the position of the individual means for displacing the plastics material and, as form-fitting and/or force-fitting means, produce a joint, suitable for force transmission, between the means for displacing the plastics material and the sandwich sheet via the receptacle for the sandwich sheet.

Appropriate positioning means can be for example a simple profile in which a plurality of means for displacing the plastics material are arranged and the profile is positioned in engagement with form-fitting or force-fitting means, provided therefor, of the receptacle. As a result, it is possible to simultaneously position a multiplicity of means for displacing the plastics material. The effort required for providing the sandwich sheet for the introduction of the joining regions can thereby be reduced.

According to a further teaching of the present invention, the object presented is achieved by an apparatus of the generic type in that the means for displacing the plastics material are preloadable with a predetermined force and the predetermined force can be exerted on the sandwich sheet such that when the plastics material of the core layer of the sandwich sheet softens, the plastics material can be displaced out of the joining region via the preloaded means for displacing the plastics material.

By way of the means for displacing the plastics material that are preloaded by a predetermined force, it is possible to create one or more joining regions in the sandwich sheet, these allowing a welded joint, for example a spot weld, or to provide openings with a metal periphery for the use of fastening means by way of a simple process for heating the core layer. Preloadable within the meaning of the present invention means that the means for displacing the plastics material are able to be activated, after being positioned in the joining region of the sandwich sheet, such that they exert a force on the sandwich sheet, said force sufficing to displace the plastics material out of the core layer of the sandwich sheet when the plastics material is heated. As a result, it is possible to initially position the means for displacing the plastics material easily and precisely in a non-preloaded state. After positioning, the force can be exerted on the joining region of the not yet heated sandwich sheet by preloading the means for displacing the plastics material. The displacement process can thus be extended simultaneously to a plurality of heated joining regions of the sandwich sheet.

Preferably, the means for displacing the plastics material have means for the pneumatic, hydraulic and/or spring-elastic generation of the predetermined force. Although pneumatic or hydraulic means for generating the predetermined force have a more complex structure than spring-elastic means, they can be preloaded in a particularly easy manner. Spring-elastic means for generating the predetermined force consist for example of a mechanical spring and therefore have a particularly simple structure. They are therefore particularly cost-effective.

According to a further configuration of the apparatus, the receptacle for the sandwich sheet is configured as a clamping apparatus, wherein the means for displacing the plastics material are integrated into the clamping apparatus. The receptacle configured as a clamping apparatus can have for example spring-elastic means which clamp the joining region to be produced in place between two receiving plates and subject it to a force such that when the core layer is heated, the latter is accordingly deformed. As a result, it is possible for example for peripheral regions of sandwich sheets to be equipped particularly easily with corresponding joining regions.

Preferably, according to a further configuration, the means for displacing the plastics material are positionable individually or in groups on the receptacle for the sandwich sheet and have a punch that is movable perpendicularly to the surface of the sandwich sheet, said punch being preloadable pneumatically, hydraulically or via a mechanical spring. By way of corresponding means for displacing the plastics material, joining regions can be produced at different positions on the sandwich sheet with little effort. The punch geometry can in this case be adapted to the joining regions to be produced, such that it is for example also possible to produce different geometrically distinctive joining regions by using individual means for displacing the plastics material or means for displacing the plastics material that are positionable in groups on the receptacle of the sandwich sheet.

According to a further configuration of the apparatus, the receptacle for the sandwich sheet has embossing regions in the region of joining regions of the sandwich sheet that are to be produced, such that for example when means for displacing the plastics material that are positionable on the receptacle of the sandwich sheet are used, the deformation of the metal cover layers of the sandwich sheet in the joining regions can be controlled via the embossing regions.

According to a further configuration of the apparatus, means for heating the core layer of the sandwich sheet can be provided, such that the apparatus as such is capable, even without additional further devices, of producing the joining regions after the means for displacing the plastics material have been preloaded.

Preferably, means for heating the core layer are provided, said means heating the core layer of the sandwich sheet by using ultrasonic vibrations. It has been found that the use of ultrasonic vibrations affords a particularly simple possibility of heating for example a sandwich sheet, which is positioned in a receptacle, over its entire surface by way of ultrasonic vibrations transmitted from the receptacle, such that uniform heating of the core layer of the sandwich sheet is achieved. In particular, it is possible as a result to prevent the entire apparatus from being heated fully.

Finally, according to a further variant, positioning means by way of which the means for displacing the plastics material can be positioned individually or in groups are provided. Via positioning means, for example simple profiles or templates, the positioning of the means for displacing the plastics material can be considerably simplified. In particular, the positioning means can also use form-fitting means of the receptacle in order to ensure the transmission of force to the sandwich sheet. Furthermore, guide means for positioning a plurality of means for displacing the plastics material can be used.

Figure 1:
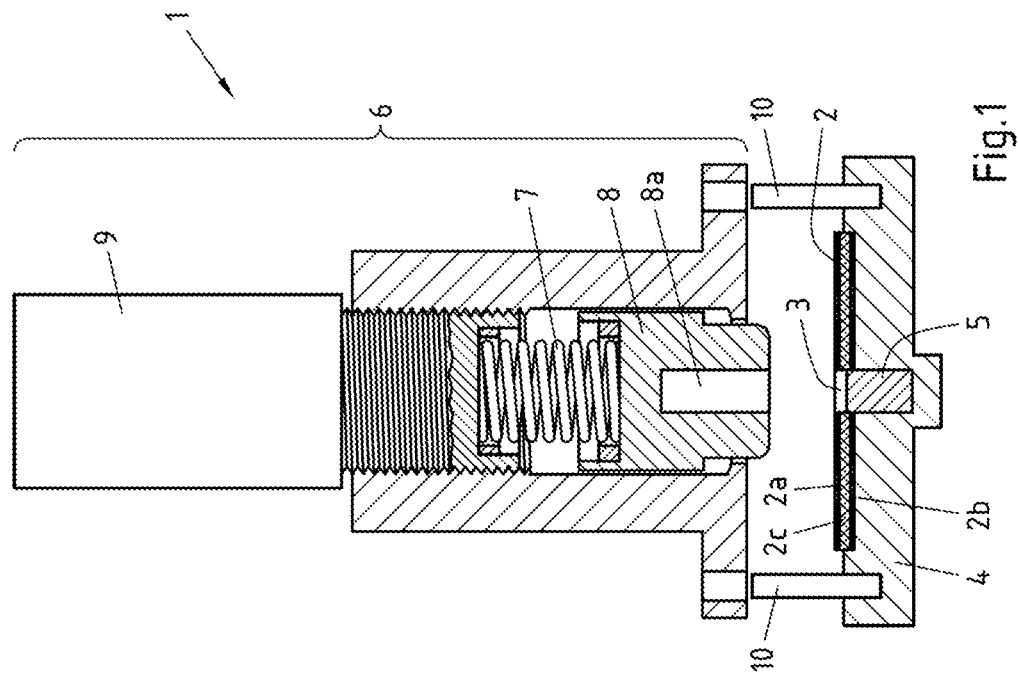
FIG. 1 is a schematic cross-sectional view of an example apparatus for producing at least one example joining region in an example sandwich sheet by way of a mechanism for displacing plastics material.

FIG. 1 illustrates a first exemplary embodiment of an apparatus 1 for producing at least one joining region in a sandwich sheet 2. The sandwich sheet 2 consists of two outer cover sheets 2a, 2b and a central core layer 2c which consists of a preferably thermoplastic material. In the present exemplary embodiment, the composite sheet 2 has an opening 3 which is intended to be configured for joining the sandwich sheet to further components by using fastening means such as screws or a rivet.

The apparatus 1 for producing at least one joining region comprises a receptacle 4 for the sandwich sheet 2, in which, in the present exemplary embodiment, a positioning aid 5 for positioning the sandwich sheet 2 is provided. Furthermore, the apparatus has means 6 for displacing the plastics material, said means being preloaded with a predetermined force. The means 6 for displacing the plastics material have a punch 8 that is mechanically preloaded via a spring 7, wherein the predetermined force which the punch 8 exerts on the sandwich sheet 2 is settable via a punch holder 9, the vertical position of which is variable. Furthermore, the predetermined force with which the punch 8 is intended to be pressed against the sandwich sheet can be additionally predetermined by the selection of a suitable spring 7. The means 6 for displacing the plastics material are arranged on the receptacle 4 of the sandwich sheet via guide pins 10. By screwing the means 6 for displacing the plastics material to the receptacle 4, for example via the guide pins 10, a suitable joint is produced, via a form-fit, between the means 6 for displacing the plastics material and the sandwich sheet 2 via the receptacle 4. In this position, the punch 8 presses against the joining region of the sandwich sheet 2 with a predetermined force perpendicularly to the surface of the sandwich sheet 2, said joining region corresponding in the present case to the peripheral region of the opening 3. If the core layer 2c of the sandwich sheet 2 is now heated sufficiently so that it softens, the plastics material is displaced out of the peripheral region of the opening 3 into the opening itself via the punch 8. In order to make this easier, the punch 8 additionally has an opening 8a through which the pressed-out plastics material can flow.

The exemplary embodiment of an apparatus schematically illustrated in FIG. 1 can be used not only for flat sandwich sheets 2.

FIG. 2 schematically illustrates a perspective illustration of an apparatus 11 which has a three-dimensional structure that corresponds to the shape, arranged under the apparatus 11, of the sandwich sheet. Means 6 for displacing the plastics material are arranged on the apparatus 11. The means 6 for displacing the plastics material are provided at any desired positions on the three-dimensionally shaped sandwich sheet that are intended for producing joining regions.

FIGS. 3 to 6 disclose apparatuses 12, 13, 14, 15 for producing a joining region in a sandwich sheet, which are configured as clamping apparatuses and in which the means 6 for displacing the plastics material are already integrated. To this end, the clamping apparatuses 12, 13, 14, 15 are each equipped with a spring-loaded receiving plate 12a, 13a, 14a, 15a which presses the sandwich sheet 2 against an abutment plate 12c, 13c, 14c, 15c via a spring 12b, 13b, 14b, 15b. A predetermined force can be exerted on the sandwich sheet 2 perpendicularly to the surface thereof via the springs 12b, 13b, 14b, 15b. The force is illustrated in FIGS. 3 to 6 by way of arrows. Via embossing regions 12d, 13d, 14d, 15d that are provided, it is possible to determine which of the metal cover layers of the sandwich sheet 2 are intended to be deformed during the displacement of the plastics material. Thus, for example the apparatuses 12, 13 illustrated in FIGS. 3 and 4 are both deformed with metal cover layers during the heating of the core layer of the sandwich sheet 2. By contrast, the apparatuses 14, 15 for producing a joining region in FIGS. 5 and 6 only deform the upper metal cover layer of the sandwich sheet 2.

Finally, FIGS. 3 and 5 indicate that a joining region can be produced via the apparatuses 12, 14 without the presence of an opening in the sandwich sheet. These joining regions can be used for example for weld spots. In FIGS. 4 and 6, in contrast, the joining region is produced in the peripheral region of an opening 3 in a sandwich sheet 2.

Figure 7:
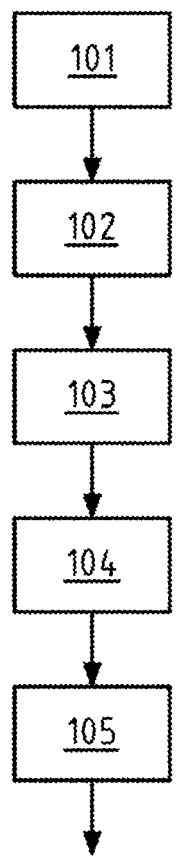
FIG. 7 is a flow chart representing an example method for producing joining regions of composite sheets.

An exemplary embodiment of the method according to the invention is illustrated in a schematic flow chart in FIG. 7. In method step 101, first of all means 6 for displacing the plastics material of the core layer are arranged in at least one joining region of a sandwich sheet 2 and the means 6 for displacing the plastics material are preloaded, method step 102. Subsequently, the core layer of the sandwich sheet 2 is heated according to method step 103 until said core layer softens. By way of the preloaded means 6 for displacing the plastics material, as a result of the force exerted on the sandwich sheet, the plastics material of the core layer is displaced out of the joining region, method step 104. Subsequently, the sandwich sheet 2 merely has to be removed from the apparatus 1 or demolded. This is indicated by method step 105.

Method step 103 is schematically illustrated in FIG. 8. As can be seen in FIG. 8, for example the entire apparatus, including preloaded means 6 for displacing the plastics material, is heated in an oven O. The heating temperature depends on the plastics material of the core layer of the sandwich sheet 2. Usually, appropriate temperatures are between 100° C. and 350° C., preferably between 140° C. and 280° C. After the core layer of the sandwich sheet 2 has softened, the plastics material is displaced out of the joining regions via the preloaded means 6 for displacing the plastics material and the metal cover layers are brought into contact in this region. Joining regions which consist substantially only of metal are created. The joining regions are illustrated in FIG. 10a, b. These figures represent a sectional illustration of the sandwich sheet 2 which is provided with a joining region in a perspective manner in FIG. 9 and was produced by the method according to the invention. As can be seen, the peripheral region 2d of the opening 3 is produced by deformation of both metal cover layers in FIG. 10a. The joining region is arranged between the two metal cover layers. In FIG. 10b, in contrast, only the upper metal cover layer 2a was deformed in the joining region or peripheral region 2d. The lower metal cover layer 2b remains undeformed.

In a schematic sectional view in FIG. 11, means 6 for displacing the plastics material are arranged on a sandwich sheet 2 via a positioning means 16 configured as a profile, wherein the rail 16 is connected to the receptacle 4 of the sandwich sheet via form-fitting or force-fitting means. In order to displace the plastics material, the means 6 are preloaded via pneumatic, hydraulic or spring-elastic means for creating the predetermined force. Furthermore, a means 17 for producing ultrasonic vibrations is indicated in FIG. 11, said means passing ultrasonic vibrations into the receptacle 4 such that the sandwich sheet 2 is heated by transmission of the ultrasonic vibrations. As a result, the core layer 2c of the sandwich sheet 2 is also heated. Once the required temperature of the core layer has been reached, the latter softens and is displaced out of the corresponding joining regions via the means 6 for displacing the plastics material.

In FIG. 12, as an alternative to the use of the means 17 for producing ultrasonic vibrations, the entire receptacle 4, together with the means 6 for displacing the plastics material and the sandwich sheet 2, is illustrated in an oven which is then heated up to a corresponding temperature. As a result, it is for example possible to simultaneously equip a multiplicity of sandwich sheets with joining regions by using corresponding ovens, said joining regions either allowing welded joints or durable connections to other components via fastening means such as screws or a rivet.

Figure 14:
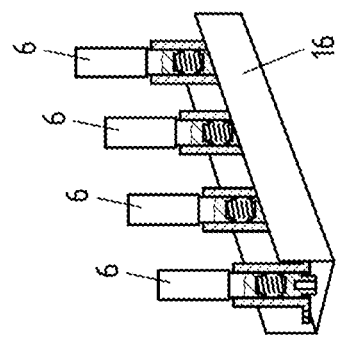
FIG. 14 is a schematic perspective view of an example positioning mechanism for a mechanism for displacing plastic material.
Figure 13:
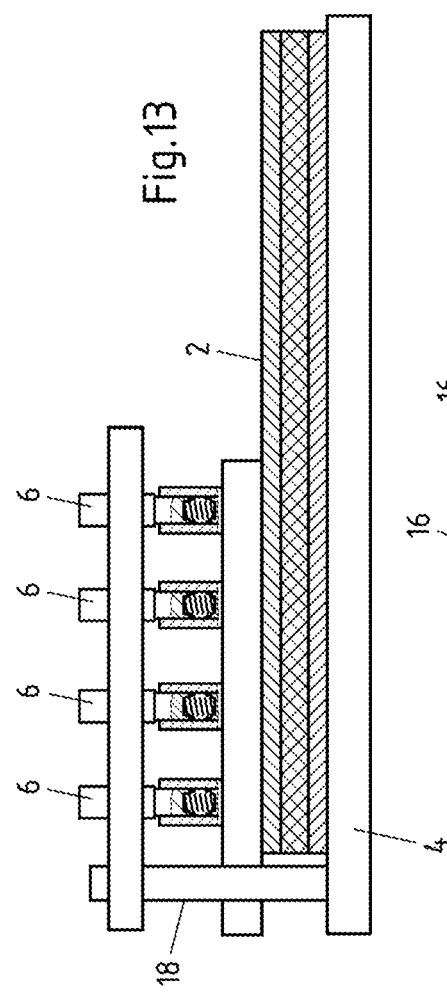
FIG. 13 is a schematic cross-sectional view of an example apparatus with a positioning mechanism for displacing plastic material.

Positioning means in which the means 6 for displacing the plastics material are arranged are illustrated in a perspective view in FIG. 14. Corresponding means can also be connected to the receptacle 4 in a form- and/or force-fitting manner via a lever construction 18 for example in simpler apparatuses for producing joining regions, such that the means 6 for displacing the plastics material displace the plastics material in the corresponding joining regions and thus provide metal joining regions for joining the sandwich sheet 2 to further components, FIG. 13.

Figure 15:
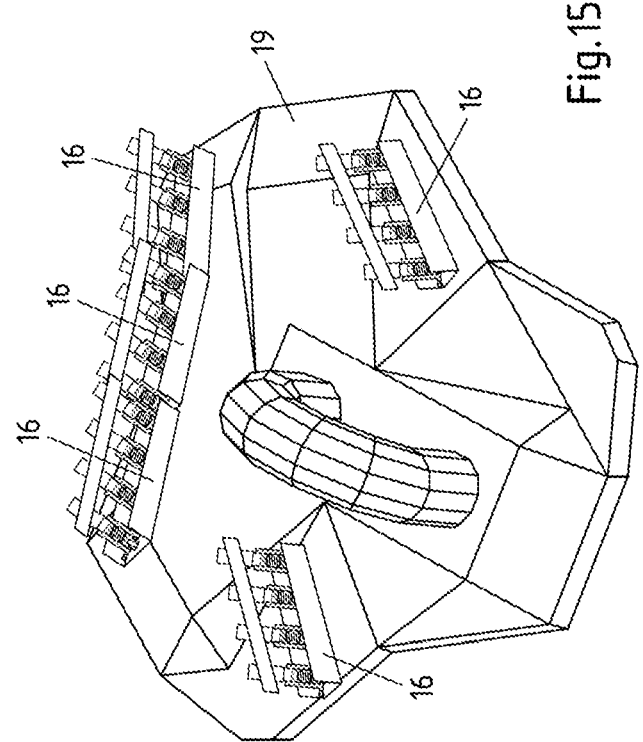
FIG. 15 is a schematic perspective view of another example apparatus for producing a joining region by using the positioning mechanism shown in FIG. 14.

Finally, FIG. 15 shows the arrangement of the positioning means from FIG. 14 for a three-dimensionally shaped sandwich sheet which is provided beneath the form-fitting or force-fitting means 19 illustrated in FIG. 15.

What is claimed is:

1. A method for producing a joining region in a sandwich sheet that comprises a plastic core layer disposed between two metal cover layers, with the joining region configured for joining the sandwich sheet to another sandwich sheet or another component by way of a fastener, the method comprising:
   positioning in a region to be joined of the sandwich sheet a mechanism for displacing plastic material of the plastic core layer out of the region to be joined;
   exerting a force from the mechanism for displacing the plastic material perpendicular to a surface of the region to be joined; and
   heating the plastic core layer of the sandwich sheet so as to soften and at least partially displace the plastic material from the region to be joined such that the two metal cover layers are thereafter brought into contact, by the force exerted by the mechanism for displacing the plastic material, in a space where the plastic material has been displaced.

2. The method of claim 1 wherein the mechanism for displacing the plastic material is a first mechanism for displacing the plastic material, the method further comprising:
   positioning in a first region to be joined of the sandwich sheet the first mechanism for displacing the plastic material and positioning in a second region to be joined of the sandwich sheet a second mechanism for displacing the plastic material; and
   bringing the two metal cover layers at least partially into contact in the first and second regions to be joined.

3. The method of claim 1 further comprising deforming at least one of the two metal cover layers in the region to be joined.

4. The method of claim 1 further comprising:
   introducing the sandwich sheet into a receptacle;
   positioning the mechanism for displacing the plastic material in the region to be joined on a side of the sandwich sheet opposite the receptacle;
   producing via at least one of form-fitting or force-fitting a joint suitable for force transmission between the mechanism for displacing the plastic material and the sandwich sheet via the receptacle; and
   preloading the mechanism for displacing the plastic material.

5. The method of claim 1 wherein the heating of the plastic core layer of the sandwich sheet occurs by convective, conductive, or radiative heat transfer.

6. The method of claim 1 wherein the heating of the plastic core layer of the sandwich sheet occurs by ultrasonic vibrations.

7. The method of claim 1 wherein the exerting the force from the mechanism for displacing the plastic material comprises guiding a punch of the mechanism for displacing the plastic material perpendicular to the surface of the region to be joined of the sandwich sheet, wherein the force from the punch presses the plastic material out of a volume between the two metal cover layers of the sandwich sheet that aligns with a footprint of the punch.

8. The method of claim 1 wherein the force exerted by the mechanism for displacing the plastic material is generated at least one of pneumatically, hydraulically, or by way of one or more mechanical springs.

9. The method of claim 1 wherein the positioning of the mechanism for displacing the plastic material is performed by a guide mechanism of a receptacle for the sandwich sheet.

10. The method of claim 1, wherein the mechanism for displacing the plastics material comprises a plurality of mechanisms for displacing the plastics material, and wherein the method further comprises:
    determining a position for each of the plurality of mechanisms for displacing the plastics material;
    positioning simultaneously the plurality of mechanisms for displacing the plastics material; and
    producing by at least one of form-fitting or force-fitting a joint suitable for force transmission between the plurality of mechanisms for displacing the plastic material and the sandwich sheet via a receptacle for the sandwich sheet.

11. The method of claim 1 wherein at least a portion of the space where the two metal cover layers are brought into contact is located at a periphery of a through-opening in the region to be joined.

12. A method for producing a joining region in a sandwich sheet that comprises a plastic core layer disposed between two metal cover layers, the method comprising:
    positioning in a region to be joined of the sandwich sheet a mechanism for displacing plastic material of the plastic core layer out of the region to be joined, wherein the region to be joined corresponds to a peripheral region of an opening that extends through the sandwich sheet;
    exerting a force from the mechanism for displacing the plastic material perpendicular to a surface of the peripheral region of the opening; and
    heating the plastic core layer of the sandwich sheet so as to soften and at least partially displace the plastic material from the peripheral region of the opening such that the two metal cover layers are thereafter brought into contact, by the force exerted by the mechanism for displacing the plastic material, in the peripheral region of the opening in the region to be joined by displacement of the plastic material.

\* \* \* \* \*